US011340477B2

(12) United States Patent
Bühren et al.

(10) Patent No.: US 11,340,477 B2
(45) Date of Patent: May 24, 2022

(54) METHOD FOR ADAPTING A CORRECTIVE EFFECT OF AN OPHTHALMIC LENS, OPHTHALMIC LENS AND USE OF AN OPHTHALMIC LENS (71) Applicant: Carl Zeiss AG, Oberkochen (DE)

(72) Inventors: Tobias Bühren, Ulm (DE); Michael Kempe, Jena (DE)

(73) Assignee: Carl Zeiss AG, Oberkochen (DE)

( * ) Notice: Subject to any disclaimer, the term of this patent is extended or adjusted under 35 U.S.C. 154(b) by 0 days.

(21) Appl. No.: 17/411,207

(22) Filed: Aug. 25, 2021

(65) Prior Publication Data
US 2021/0389609 A1 Dec. 16, 2021

Related U.S. Application Data (63) Continuation of application No. PCT/EP2020/055263, filed on Feb. 28, 2020.

(30) Foreign Application Priority Data

Mar. 1, 2019 (DE) ...................... 10 2019 105 247.5

(51) Int. Cl.
G02C 7/08 (2006.01)
G02C 7/06 (2006.01)
(52) U.S. Cl.
CPC ............... G02C 7/083 (2013.01); G02C 7/06 (2013.01); G02C 2202/20 (2013.01); G02C 2202/24 (2013.01)

(58) Field of Classification Search
CPC ...... G02C 7/083; G02C 7/06; G02C 2202/20; G02C 2202/24
See application file for complete search history.

(56) References Cited

U.S. PATENT DOCUMENTS 7,775,660 B2 * 8/2010 Stewart .................. G02C 7/083
351/159.44
10,073,281 B1 9/2018 Gromotka et al.
2016/0313572 A1 * 10/2016 Haddock ............. G02B 5/1895

FOREIGN PATENT DOCUMENTS

| EP | 3223066 A1 | 9/2017 |
| JP | 2010139892 A | 6/2010 |
| WO | 2005033782 A2 | 4/2005 |
| WO | 2014198027 A1 | 12/2014 |
| WO | 2017060379 A1 | 4/2017 |

(Continued)

OTHER PUBLICATIONS

Ren et al., "Tunable-focus flat liquid crystal spherical lens," Applied Physics Letters 84, vol. 23, pp. 4789 to 4791 (2004).

(Continued)

Primary Examiner — Tuyen Tra
(74) Attorney, Agent, or Firm — Tautz & Schuhmacher LLC; Georg Hasselmann (57) ABSTRACT An ophthalmic lens has a changeable corrective effect, which automatically changes over a predetermined period of time. Further, the ophthalmic lens provides a gradually increasing undercorrection of the far point of the eye over the course of a day, which brings about a deceleration in the axial length growth of the eyeball. In addition, a method for automatically adapting a corrective effect, a pair of spectacles, and a use of an ophthalmic lens are disclosed.

2 Claims, 2 Drawing Sheets (56) References Cited

FOREIGN PATENT DOCUMENTS

WO   2018215611 A1   11/2018
WO   2018219828 A1   12/2018

OTHER PUBLICATIONS

Barbero et al. "Adjustable-focus lenses based on the Alvarez principle," Journal of Optics 13.12, 125705 (2011).
Lin et al., "A review of electrically tunable focusing liquid crystal lenses," Transactions on Electrical and Electronic Materials 12.6, pp. 234-240 (2011).
Douali et al. "Self-optimised vision correction with adaptive spectacle lenses in developing countries," Ophthal. Physiol. Opt. vol. 24, pp. 234 to 241, 2004.
Liu et al. "The Safety of Orthokeratology—A Systematic Review," Eye & Contact Lens vol. 42, No. 1, pp. 35 to 42, Jan. 2016.
PCT Collaborative Search and Examination Pilot peer contribution by the USPTO, uploaded Apr. 14, 2020.
International Search Report issued in PCT/EP2020/055263, to which this application claims priority, dated May 25, 2020, and English-language translation thereof.
Written Opinion issued in PCT/EP2020/055263, to which this application claims priority, dated May 25, 2020.
International Preliminary Report on Patentability issued in PCT/EP2020/055263, to which this application claims priority, dated Jun. 21, 2021, and English-language translation thereof.

* cited by examiner

METHOD FOR ADAPTING A CORRECTIVE EFFECT OF AN OPHTHALMIC LENS, OPHTHALMIC LENS AND USE OF AN OPHTHALMIC LENS

CROSS REFERENCE TO RELATED APPLICATIONS

This application is a continuation application of international patent application PCT/EP2020/055263, filed Feb. 28, 2020, designating the United States and claiming priority from German patent application 10 2019 105 247.5, filed Mar. 1, 2019, and the entire content of both applications is incorporated herein by reference.

TECHNICAL FIELD

The present disclosure relates to a method for adapting a corrective effect of an ophthalmic lens, an ophthalmic lens and a use of an ophthalmic lens. Therefore, the disclosure lies in the field of optics, in particular in the field of spectacle lenses and visual aids.

BACKGROUND

Myopia, i.e., nearsightedness, can be observed to be on the increase worldwide. In Asia, in particular, a particularly large increase in the number of people with nearsightedness can be detected. Myopia or nearsightedness denotes a refractive error in which the image of an object located at infinity arises in a plane in front of the retina in the case of a relaxed accommodation of the eye and the light striking the retina correspondingly represents an out-of-focus image. Often, myopia is a refractive error that deteriorates over time by virtue of the ametropic eye becoming ever longer over time and the image plane therefore distancing itself ever further from the retina.

The etiology of myopia is considered to have many factors and the mechanisms of the errant axial length growth of the eyeball are still not comprehensively understood. Therefore, myopia previously counted as incurable or irreversible. Here, correcting myopia by means of spectacle lenses or refractive corneal surgery should be considered as fighting the symptoms because the errant axial length growth of the eyeball is not reversed.

The related art has disclosed various approaches for controlling the development of myopia or the advance of myopia, for instance the use of bifocal spectacle lenses and progressive power spectacle lenses, particularly for children, hard, gas-permeable contact lenses for children, orthokeratological (ortho-k) contact lenses, local applications of medicaments for controlling the accommodation, visual training or else maximizing the time spent outdoors. Although some of these known approaches may slow down the advance of myopia in certain cases, none of these known approaches are able to produce a verifiable effect for the complete removal of myopia or the complete stop of the advance of myopia.

Apart from treatments using medicaments, for instance Atropine or Pirenzepine, which are not unproblematic due to side effects, particularly for children, orthokeratology (ortho-k) is one of the most effective known approaches for slowing down the advance of myopia. On account of the flattening of the cornea, and the corneal profile connected therewith, caused by the ortho-k contact lens, the prevailing opinion is that a change in the peripheral retinal refraction pattern is a reason for the effect of ortho-k lenses on the advance of myopia and the axial length growth of the eyeball. However, an ortho-k treatment is also connected to risks, for instance microbial keratitis, corneal discoloring, epithelial iron deposition, pronounced fibrillar stripes and changes in the biomechanical properties of the cornea. Moreover, a promising application of ortho-k contact lenses requires a very good fit of the contact lenses, strict observance of the use and cleaning prescriptions, regular routine check-ups and comprehensive and suitable treatment of the eye in the case of complications. Additionally, there may be ethical concerns in respect of the application of contact lenses for child patients, which cause a significant deformation of the cornea overnight and which have permanent effects on the oxygen supply of the cornea. A study regarding the risks of orthokeratology can be found in the publication by Liu et al., *Eye & Contact Lens*, 42, 1, Jan. 2016, for example.

The publication WO 2018/219828 A1 describes an optical object with two active lenses and a time-based mechanism for varying the refractive power of the two active lenses.

The publication WO 2014/198027 A1 describes spectacle lenses for improving the vision of myopia and hyperopia patients.

EP 3 223 066 A1 describes an ophthalmic lens for delaying, controlling or preventing the development or progression of myopia.

SUMMARY

It is therefore an object of the disclosure to provide an option for treating and/or preventing myopia, which does not have the disadvantages of the aforementioned approaches.

The inventors have recognized that the essential mechanism for treatment with ortho-k contact lenses is dynamic. Contrary to the prevalent opinion, the mechanism is not caused by changing the peripheral retinal refraction pattern and does not slow the advance of myopia and the axial length growth of the eyeball in this way. The mechanism is caused by the dynamic back-deformation of the cornea following removal and prior to the reinsertion of the ortho-k contact lens, and the rapid myopization, connected therewith, in the form of an image plane distancing itself ever further from the retina. Here, the mechanism represents a unique signal for all object planes within the scope of dynamic vision. This mechanism also explains why ortho-k contact lenses more effectively slow down the axial length growth of the eyeball than other static correction approaches, which cause a change in the peripheral retinal refraction pattern. By way of example, static correction approaches include spectacle lenses or contact lenses which should not cause a deformation of the cornea.

The disclosure relates to an ophthalmic lens, a pair of spectacles, a method and the use of an ophthalmic lens having the features of the respective independent claims. Exemplary embodiments are the subject matter of the dependent claims and the following description.

In a first aspect, the disclosure relates to an ophthalmic lens with a changeable corrective effect, wherein the ophthalmic lens is characterized in that the ophthalmic lens is designed to automatically change the corrective effect over a predetermined period of time. This automated change in the corrective effect of the ophthalmic lens should simulate in this case the dynamic mechanism of an ortho-k contact lens (dynamic back-deformation of the cornea), which, following the removal and proir to the reinsertion of same, generates an image plane distancing itself ever further from the retina. Here, this automated change in the corrective effect essentially differs from the related art to the effect that:
- the speed of the change is multiple times slower than in the case of changeable corrective effects for compensating presbyopia within the scope of dynamic vision,
- there is a gradually increasing under-correction of the far point of the eye in contrast to the complete correction for each visual task in the related art,
- the gradually increasing under-correction of the far point of the eye represents an unchanging signal within the scope of under-correction for each visual task, i.e., also represents less accommodation effort in the intermediate and near region,
- there is no adaptation of the changeable corrective effect for a changing complete correction, and
- the gradually increasing under-correction of the far point of the eye brings about a deceleration in the axial length growth of the eyeball.

The far point of the eye refers to the end point of the visual line, on which the eye is set without accommodation. In the case of an emmetropic (normal-sighted) eye, it lies at infinity (equated to 6 m in practice), it is situated in front thereof in the case of myopic (nearsighted) eye and therebehind in the case of hyperopic eye.

The dynamic vision comprises the visual range of the eye, from the far point via the intermediate region to the near point (point of maximum accommodation), i.e., all visual distances.

The gradually increasing under-correction of the far point of the eye brings about a slowing-down of the axial length growth of the eyeball by virtue of a rapid myopization in the form of an image plane distancing itself ever further from the retina being simulated. Here, "rapid" means a period of time, typically from 30 minutes to 18 hours, further typically from 1 hour to 17 hours, further typically from 2 hours to 16 hours, particularly typically from 3 hours to 15 hours and very particularly typically from 4 hours to 14 hours.

Table 1, below, shows the comparison of a changed corrective effect over a predetermined period of time when adapting the complete correction, when compensating presbyopia, when having a real myopization or progression of myopia, and when having a dynamic back-deformation of the cornea following the removal and prior to the reinsertion of the ortho-k contact lens with an ophthalmic lens, which simulates a rapid myopization in the form of an image plane distancing itself ever further from the retina and consequently imitates the effect of an ortho-k contact lens:

simulation is significantly higher, but comparable to the spectacle wearer with a real myopization of −0.0007 to −0.005 per 24 hours.

A substantial difference between the ophthalmic lens according to the disclosure, which causes a gradually increasing undercorrection of the far point of the eye and consequently simulates the effect of an ortho-k contact lens, from changeable spectacle lenses from the related art, such as WO 2017/060379 A1 or WO 2018/215611 A1, is that the ophthalmic lens typically only brings about a complete correction, typically in the case of non-presbiopic persons, for the distance, only during a first period of time of typically less than 30 minutes, further typically less than 20 minutes Further, the disclosure relates to a pair of spectacles having at least one ophthalmic lens according to the disclosure.

In a further aspect, the disclosure relates to a method for automatically adapting a corrective effect of an ophthalmic lens, characterized in that the method comprises an automated change in the corrective effect over a predetermined period of time. This predetermined period of time typically lies in a range from 30 minutes to 18 hours, further typically from 1 hour to 17 hours, further typically from 2 hours to 16 hours, particularly typically from 3 hours to 15 hours and very particularly typically from 4 hours to 14 hours. This automated change in the corrective effect simulates the effect of an ortho-k contact lens, as already described above.

In a further aspect, the disclosure relates to the use of an ophthalmic lens with a corrective effect that is automatically changeable over a predetermined period of time, for creating a medical device for treating and/or preventing myopia.

Moreover, the disclosure relates to a method for treating and/or preventing myopia, wherein the method comprises a provision of an ophthalmic lens with a changeable corrective effect and an automated change in the corrective effect over a predetermined period of time.

Here, in particular, an ophthalmic lens is an optical lens for correcting and/or treating and/or preventing refractive errors. In particular, an ophthalmic lens can be embodied as spectacle lens or as a contact lens. A spectacle lens is typically a finished spectacle lens here. However, the spectacle lens can typically also be present as a combination of a finished spectacle lens with a spectacle lens with a changeable corrective effect.

Here, the corrective effect is typically a refractive and/or diffractive effect of the spectacle lens or comprises such an

TABLE 1

| Change in the corrective effect | Diopter | Time | Diopter/time |
| --- | --- | --- | --- |
| Adaptation of the complete correction | ±0.25 to ±20.0 | immediately | ±0.25 to ±20.0/1 s |
| Compensation of presbyopia | +0.25 to +4.0 | immediately | +0.25 to +4.0/1 s |
| Myopization | −0.25 to −2.0 | per year | −0.0007 to −0.005/24 h |
| Ortho-k contact lens | 30% regression, i.e., −0.25 to −2.0 | per 24 h (minus time of wear) | −0.25 to −2.0/24 h (minus time of wear) |
| Rapid myopization by ortho-k simulation | −0.25 to −2.0 | per 24 h (minus time of wear) | −0.25 to −2.0/24 h (minus time of wear) |
| Rapid myopization by ortho-k simulation | −0.25 to −2.0 | 30 min to 18 h | −0.5 to −4.0/30 min to −0.013 to −0.11/18 h |

As is evident from table 1, the rapid myopization by ortho-k simulation lies in a range of −0.013 to −0.11 per 18 hours. In this range, the rapid myopization by ortho-k effect. By way of example, the corrective effect can be embodied in such a way that the latter is designed to correct a refractive error of an eye in the case of intended use and/or to have a prophylactic effect on the eye in the case of intended use.

Here, the fact that the change in the corrective effect and hence the simulation of an ortho-k contact lens is implemented in automated fashion means that the user of the ophthalmic lens or the wearer of a pair of spectacles with the ophthalmic lens need not bring about the change themselves, for example by way of a manual intervention, but that the ophthalmic lens and/or the pair of spectacles independently undertake the change in the corrective effect. Typically, the ophthalmic lens and/or the pair of spectacles is programmable in order to undertake the automated change of the corrective effect in person-specific fashion, in the desired way and over the desired, predetermined period of time. Particularly typically, the change in the corrective effect and/or the predetermined period of time can be set or specified by the user and/or especially trained staff.

The disclosure offers the advantage that, by means of the automated change in the corrective effect, a change in the compensation of the refractive error and/or a change in the preventative measure over the predetermined period of time can be reached without the user having to actively bring about the change. As a result of the automated change in the corrective effect, the disclosure offers the advantage that the same effect or a similar effect as can be brought about by the ortho-k contact lenses can be brought about on the eye that uses the spectacle lens.

While the deformation of the cornea caused by wearing ortho-k contact lenses at night and the back-deformation of the cornea into its original form during the day leads to a gradual change in the refractive power of the cornea, this gradual refractive change can be brought about or simulated according to the disclosure by the automated change in the corrective effect. Expressed differently, an ophthalmic lens according to the disclosure can likewise bring about a gradual change in the refractive properties of imaging, as is conventionally caused by relaxation of the cornea after ortho-k contact lenses were worn at night.

However, the disclosure offers the significant advantage that there is no need for a deformation of the cornea, no need for mechanical contact with the cornea and no need for any other impairment of the cornea for the purposes of bringing about the change in the corrective effect over the predetermined period of time. Accordingly, an ophthalmic lens according to the disclosure can bring about the desired effect, specifically the gradual, automated change in the optical properties without however having to accept the disadvantages for the eye relating to a conventional ortho-k application.

Moreover, the disclosure offers the advantage that even automated changes in the corrective effect, which cannot be achieved by conventional deformation of the cornea by means of ortho-k contact lenses, can be undertaken. Typically, an ophthalmic lens according to the disclosure can bring about qualitative and/or quantitative changes in the corrective effect and/or time periods of the change, which are not realizable by deformation of the cornea for technical and/or medical reasons. Further, the disclosure typically offers the option of undertaking the change in the corrective effect with a greater accuracy, for the purposes of optimizing the preventive and/or therapeutic effect, than is possible with ortho-k methods.

The change in the corrective effect is typically reversible. Particularly typically, the change in the corrective effect is able to be performed again within a further predetermined period of time. Expressed differently, the change in the corrective effect can typically be performed again. According to a typical exemplary embodiment, it may be necessary, to this end, to initially return the ophthalmic lens to its initial state in order to be able to perform the change in the corrective effect again. By way of example, the automated change in the corrective effect may be accompanied by a consumption of power, and so power needs to be supplied before the change in the corrective effect can be performed again. By way of example, supplying power may comprise supplying electrical power, for instance charging and/or replacing an accumulator and/or a battery. According to another exemplary embodiment, power can be supplied, for example, by supplying heat energy and/or mechanical pressure, for example by storing the spectacle lens in a heat bath and/or in a molding press. Power is typically supplied outside of the predetermined period of time during which the change in the corrective effect is implemented. Particularly typically, power is supplied when the ophthalmic lens is not in use. If the ophthalmic lens is typically used during the day, this power may be supplied at night.

Typically, the predetermined period of time is at least one minute, typically at least 30 minutes, further typically at least one hour, even further typically at least three hours, most typically at least six hours. Particularly typically, the automated change in the corrective effect simulates the change in the optical properties which also occurs by way of a deformation of the cornea after an ortho-k contact lens has been worn. However, other predetermined periods of time are also realizable. There can typically also be a change in the duration of the predetermined period of time between a plurality of applications of the spectacle lens. Typically, the predetermined period of time is no more than two days, more typically no more than one day, even more typically no more than 18 hours, very much more typically no more than 15 hours, most typically no more than twelve hours. By way of example, this can be advantageous to the effect of providing the eye sufficient time for recuperation.

Typically, the change in the corrective effect is gradual over the predetermined period of time. The gradual change can typically be linear and/or quadratic and/or cubic and/or exponential. The change can typically be monotonically increasing/decreasing and/or strictly monotonically increasing/decreasing. By way of example, this can be advantageous for reproducing the deformation or back-deformation of the cornea after an ortho-k contact lens has been worn, as this is also gradual. Typically, the automated change in the corrective effect lasts for the entire predetermined period of time. However, according to other typical exemplary embodiments, the change may also be implemented over a plurality of stages or sections during the predetermined period of time, with interruptions possibly being present between the individual stages or sections. Typically, a maximum value of the automated change in the corrective effect is at least 0.1 diopter, typically at least 0.15 diopter, more typically at least 0.2 diopter and most typically at least 0.25 diopter. As an alternative or in addition thereto, the maximum value of the automated overall change in the corrective effect over the course of a day is no more than 6 diopter, typically no more than 5 diopter, more typically no more than 4 diopter and most typically no more than 3 diopter. Particularly typically, the maximum value of the automated overall change in the corrective effect over the course of a day is in a range of 5-6 diopter or in a range of 4-5 diopter or in a range of 3-4 diopter or in a range of 0.5 to 3 diopter.

Typically, the corrective effect and/or the automated change in the corrective effect are at least partly spherical and/or cylindrical. This offers the advantage of the image plane typically at least partially displacing along the optical axis, as a result of which a positive effect for treating and/or preventing myopia can be obtained. The change in a cylindrical corrective effect can typically comprise a quantitative change in the cylindrical refractive power and/or a geometric change by way of a rotation and/or displacement of the cylinder axis.

Typically, the corrective effect comprises a refractive and/or a diffractive effect or consists thereof. Particularly typically, the automated change in the corrective effect comprises a change in a refractive and/or a diffractive effect or consists thereof. By way of example, the corrective effect can be caused by a refractive power of the ophthalmic lens and a change can be obtained by refractive and/or diffractive means. Likewise, the corrective effect can be caused by a diffractive effect and a change can be obtained by refractive and/or diffractive means. Additionally, the corrective effect can be produced by diffractive and refractive elements. By way of example, the diffractive elements can comprise Fresnel lenses. This offers a great degree of flexibility and various technical options for bringing about the corrective effect and/or the change in the corrective effect.

Typically, the ophthalmic lens has a static corrective effect in addition to the changeable corrective effect. Expressed differently, it is not the entire corrective effect that is changeable in some typical exemplary embodiments, but only a part thereof. Expressed differently, the corrective effect can be embodied in such a way that the minimum of the changed corrective effect is unequal to zero. The change in the corrective effect can typically be the same as the static corrective effect in respect of its quality and/or quantity, or these may differ from one another. By way of example, the change can lead to an increase and/or decrease and/or qualitative change in the static corrective effect. The change can also be such that the entire resultant corrective effect is greater at the start of the predetermined period of time than at the end of the predetermined period of time, or vice versa.

Typically, the ophthalmic lens is designed to actively and/or passively change the corrective effect. By way of example, an active change can consist of the refractive and/or diffractive properties of the ophthalmic lens being subject to open-loop and/or closed-loop control. By way of example, an active change can be brought about by means of one or more liquid crystal layers. Particularly typically, the ophthalmic lens is embodied as a spectacle lens and has two at least partly transparent electrodes and a liquid crystal layer disposed between the electrodes, wherein the spectacle lens is designed to automatically change the corrective effect over the predetermined period of time by means of the liquid crystal layer.

By way of example, an at least partly transparent electrode can comprise a metallic, structured electrode or can be embodied as such. By way of example, the electrode can have a mesh-like and/or grid-like structure and, for example, be formed from metal wires. As an alternative or in addition thereto, an at least partly transparent electrode can have a closed, optically at least partly transparent, electrically conductive layer, or be embodied as such, for instance made of indium-tin-oxide and/or graphene.

As an alternative or in addition thereto, the ophthalmic lens or the spectacle lens, in accordance with a typical exemplary embodiment, has refractive elements such as Alvarez lenses that are displaceable with respect to one another for actively changing the corrective effect. A displacement of the Alvarez lenses with respect to one another, perpendicular to the optical axis can be used, for example, for a refractive adaptation of the corrective effect. A further option for actively changing the corrective effect can be typically implemented by means of liquid-filled lenses or spectacle lenses, wherein liquid is automatically introduced into or removed from a reservoir in the spectacle lens in order to change the refractive power of the spectacle lens. To this end, the spectacle lens can have, for example, transparent, liquid-tight membranes which form the reservoir for receiving the liquid. Spectacle lenses on the basis of Alvarez lenses and/or liquid-filled lenses can typically also be provided with an additional static corrective effect.

By way of example, a passive change can be brought about by means of one or more phase change materials, which at least partly change the refractive index thereof over the course of the predetermined period of time and thus bring about a refractive change in the corrective effect of the ophthalmic lens. By way of example, a phase change of at least one phase change material from the liquid phase into the solid phase and/or in reverse can be used to change its refractive index according to one typical exemplary embodiment. Also, typically diffractive structures can be passively provided and/or removed and/or changed over the course of the predetermined period of time in order to bring about the change in the corrective effect.

According to typical exemplary embodiments, a passive, automated change in the corrective effect of an ophthalmic lens can moreover be brought about by passive molding methods for the optical material of the ophthalmic lens. By way of example, this can be implemented in a manner similar to the ortho-k method, with the decisive difference that, according to these exemplary embodiments, the ophthalmic lens, i.e., typically a spectacle lens or contact lens, is deformed and again returns to its original form over the predetermined period of time instead of the cornea of the eye with a visual defect, which is treated by an ortho-k method. Typically, provision can be made here for the ophthalmic lens to be deformed before the predetermined period of time, for example overnight, in order then to obtain a change in the corrective effect by way of the return of the spectacle lens to the original form. By way of example, this can be implemented by means of a molding apparatus, into which the ophthalmic lens or the pair of spectacles should be inserted, said molding apparatus thereupon bringing the ophthalmic lens or the spectacle lens into the desired form according to a user-specific or individually adapted mold. Typically, the molding procedure can be assisted by heating the ophthalmic lens. The relaxation or return of the ophthalmic lens to the original form following the removal from the molding apparatus typically has in this case a time constant that corresponds to the predetermined period of time, wherein the deformation can typically be assisted by thermal relaxation. By way of example, such a thermal relaxation can occur at a temperature of approximately 40° C. to 60° C., for instance in order to exploit a shape memory effect of polymer materials. Typically, such a method can be used in the case of contact lenses and also in the case of spectacle lenses where the spectacle lenses or contact lenses are deformed. Additionally, a static, non-changeable corrective effect can typically be provided by virtue of the ophthalmic lens having a combination of a deformable material and a non-deformable material.

An overview of ophthalmic lenses with user-adaptable refractive power can be found, for example, in the following publications; however, the adaptation of the refractive power therein can only be implemented manually and not in automated fashion:

Ren et al., "Tunable-focus flat liquid crystal spherical lens", *Applied Physics Letters* 84, 23 (2004), 4789-4791.

Lin et al., "A review of electrically tunable focusing liquid crystal lenses" *Transactions on Electrical and Electronic Materials* 12.6 (2011), 234-240.

Barbero et al. "Adjustable-focus lenses based on the Alvarez principle" *Journal of Optics* 13.12 (2011) 125705.

Douali et al. "Self-optimised vision correction with adaptive spectacle lenses in developing countries" *Ophthalmic and Physiological Optics* 24.3 (3004): 234-241.

Typically, a pair of spectacles has at least two spectacle lenses or ophthalmic lenses according to the disclosure. Here, the pair of spectacles is typically designed to change the respective corrective effect for the two spectacle lenses in the same way and/or in different ways. This offers the advantage of being able to simultaneously treat both eyes of the user when the pair of spectacles is worn.

Further exemplary embodiments of the ophthalmic lens can be gathered from the clauses below:

Clause 1: An ophthalmic lens (11) with a changeable corrective effect, characterized in that the ophthalmic lens (11) is designed to automatically change the corrective effect over a predetermined period of time.

Clause 2: The ophthalmic lens (11) according to clause 1, wherein the change in the corrective effect is reversible and typically able to be performed again within a further predetermined period of time.

Clause 3: The ophthalmic lens (11) according to clause 1 or 2, wherein the predetermined period of time is a duration from the following list: at least one minute, at least 30 minutes, at least one hour, at least three hours or at least six hours.

Clause 4: The ophthalmic lens (11) according to any one of the preceding clauses, wherein the predetermined period of time is a duration from the following list: no more than two days, no more than one day, no more than 18 hours, no more than 15 hours or no more than twelve hours.

Clause 5: The ophthalmic lens (11) according to any one of the preceding clauses, wherein the change in the corrective effect is gradual over the predetermined period of time.

Clause 6: The ophthalmic lens (11) according to any one of the preceding clauses, wherein the corrective effect and/or the automated change in the corrective effect is at least partly spherical and/or cylindrical.

Clause 7: The ophthalmic lens (11) according to any one of the preceding clauses, wherein the corrective effect comprises a refractive and/or a diffractive effect and/or wherein the automated change in the corrective effect comprises a change in a refractive and/or a diffractive effect.

Clause 8: The ophthalmic lens (11) according to any one of the preceding clauses, wherein the ophthalmic lens (11) has a static corrective effect in addition to the changeable corrective effect.

Clause 9: The ophthalmic lens (11) according to any one of the preceding clauses, wherein the ophthalmic lens is designed to passively change the corrective effect.

Clause 10: The ophthalmic lens (11) according to any one of clauses 1 to 8, wherein the ophthalmic lens (11) is designed to actively change the corrective effect.

Clause 11: The ophthalmic lens (11) according to any one of clauses 1 to 8 and 10, wherein the ophthalmic lens is embodied as a spectacle lens (12).

Clause 12: The ophthalmic lens (11) according to clause 11, comprising two at least partly transparent electrodes (26a, 26b) and a liquid crystal layer (24) disposed between the electrodes, wherein the spectacle lens (12) is designed to automatically change the corrective effect over the predetermined period of time by means of the liquid crystal layer (24).

Clause 13: A pair of spectacles (10), comprising at least one ophthalmic lens (11) according to any one of clauses 1 to 8 and 10 to 11 embodied as a spectacle lens (12).

Clause 14: A method for automatically adapting a corrective effect of an ophthalmic lens (11), characterized in that the method comprises an automated change in the corrective effect over a predetermined period of time.

Clause 15: The use of an ophthalmic lens (11) with a corrective effect that is automatically changeable over a predetermined period of time, for creating a medical device for treating and/or preventing myopia.

BRIEF DESCRIPTION OF THE DRAWINGS

The exemplary embodiments, examples, and features explained both above and below should be understood as disclosed not only in the respectively specified combinations but also separately from one another and in other technically implementable combinations. Further details and advantages of the disclosure should now be explained in more detail on the basis of typical exemplary embodiments illustrated in the drawings, wherein.

DESCRIPTION OF EXEMPLARY EMBODIMENTS

Figure 1:
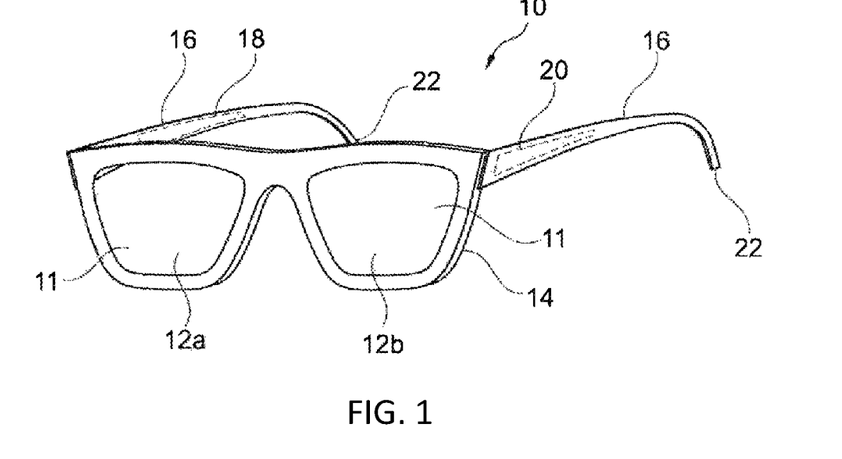
FIG. 1 shows a pair of spectacles according to a typical exemplary embodiment.

FIG. 1 shows a schematic illustration of a pair of spectacles 10 according to a typical exemplary embodiment. The pair of spectacles 10 has two ophthalmic lenses 11, which are embodied as spectacle lenses 12a and 12b and disposed in a spectacle frame 14.

The pair of spectacles 10 is designed to automatically and gradually or continuously change the corrective effect of the spectacle lenses 12a and 12b over a predetermined period of time. According to the typical exemplary embodiment, the predetermined period of time can equal a time interval during which the user typically wears the pair of spectacles over the course of a day, for example 15 hours. According to the typical exemplary embodiment, the change in the corrective effect is implemented simultaneously in both spectacle lenses, the change being implemented in such a way that, at the start of the predetermined period of time, for example every day in the morning or when the user puts on the pair of spectacles 10 and/or in another way, the change is activated and a complete correction of the myopia of the user's eyes is brought about by the spectacle lenses 12a and 12b. The automated change in the corrective effect by the pair of spectacles 10 is implemented over the predetermined period of time in such a way that there is an advancing attenuation of the corrective effect, i.e., there is an incomplete correction of the myopia, depending on the already existing refractive error, at later times during the predetermined period of time until finally, at the end of the predetermined period of time, the spectacle lenses 12a, 12b no longer provide any corrective effect or only still provide a very small corrective effect. In this way, the myopia of the user can be treated by means of the pair of spectacles 10 since, in the case of regular application, in particular by way of daily wear of the pair of spectacles, the eyes develop toward reduced myopia or a slowing-down of the eye growth, as observed during the ortho-k treatment, sets in.

Both the duration of the predetermined period of time and the quantity of the change of the corrective effect can be adapted to the user or their refractive error in this case. By way of example, the gradual, automated change of the corrective effect can tend to −0.25 diopter or 0.00 diopter at the end of the predetermined period of time, having started at −2.00 diopter. The pair of spectacles can be designed to change and/or set the duration of the predetermined period of time and/or the strength of the corrective effect and the adaptation thereof.

Figure 2A:
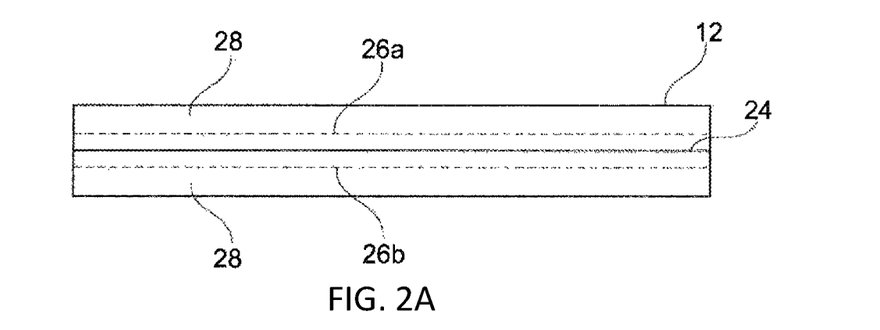
FIG. 2A shows a schematic cross-sectional illustration of an ophthalmic lens according to an exemplary embodiment.
Figure 2B:
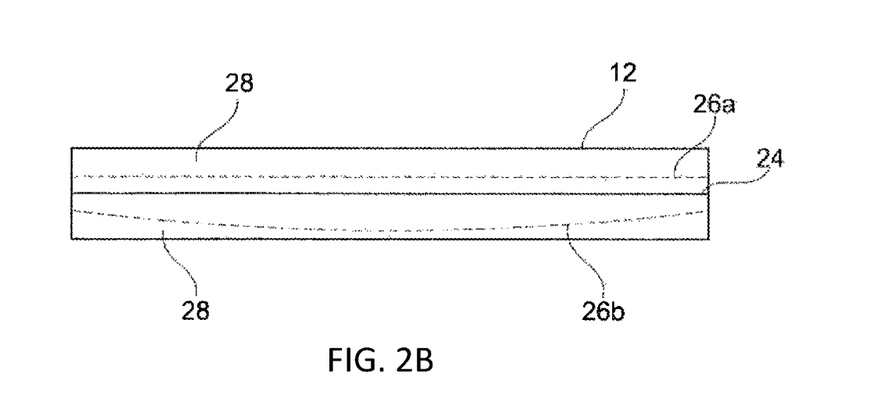
FIG. 2B shows a schematic cross-sectional illustrations of an ophthalmic lens according to another exemplary embodiment.

According to the shown exemplary embodiment, the spectacle lenses 12a and 12b have means for actively changing the corrective effect, which comprise a liquid crystal layer 24 (see FIG. 2), in particular.

For supplying the liquid crystal layer 24 with power and for controlling the latter, an electronic control unit 18, which controls the liquid crystal layer 24 accordingly, and a power reservoir 20, for example a battery and/or an accumulator, are formed in the temples 16 of the pair of spectacles 10. By way of example, the spectacle lenses 12a, 12b can be wired to the control unit 18 and to the power reservoir 20 by way of the frame 14.

Further, the pair of spectacles 10 has two connector elements 22, which facilitate the charging of the power reservoir 20 and/or communication and/or data interchange with the control unit 18. The pair of spectacles 10 can be connected to a charging station (see FIG. 3), for example, by way of the connector elements 22.

FIG. 2A shows a schematic cross-sectional illustration of an ophthalmic lens 11, embodied as a spectacle lens 12, according to a typical exemplary embodiment which has means for actively changing the corrective effect. To this end, the spectacle lens 12 has a liquid crystal layer 24 embedded in the spectacle lens and disposed between two at least partly transparent electrodes 26a and 26b. The transparent electrodes 26a and 26b can be embodied as, for example, structured electrodes, for instance with grid-like and/or mesh-like structuring. Both the liquid crystal layer 24 and the two electrodes 26a, 26b have an areal exemplary embodiment and extend over the majority, typically over the entire usable part, of the spectacle lens 12. Typically, a glass and/or polymer layer 28 is respectively formed above the upper electrode 26a and below the lower electrode 26b, said glass and/or polymer layer stabilizing and protecting the electrodes 26a, 26b and the liquid crystal layer 24. The electrodes 26a, 26b can be used to control the liquid crystal layer in order to bring about the desired change in the corrective effect.

A further typical exemplary embodiment of a spectacle lens 12 is shown in FIG. 2B; this largely corresponds to the exemplary embodiment shown in FIG. 2A with, deviating from the latter, one electrode 26a having a planar arrangement and the other electrode 26b having a spherically curved exemplary embodiment such that the latter does not lie in a plane parallel to the liquid crystal layer 24. This allows a spherical corrective change to be brought about in a particularly simple manner by virtue of changing the voltage between the two electrodes 26a and 26b. According to other typical exemplary embodiments, both electrodes 26a, 26b can also be spherically curved, with the electrodes 26a, 26b having radii of curvature that deviate from one another.

However, the aforementioned publications have also discovered other approaches for obtaining a changeable spherical effect by means of a liquid crystal layer.

The glass and/or polymer layers 28 can have a planar exemplary embodiment or have a curved exemplary embodiment, for instance in order to provide a static corrective effect. By way of example this can provide an additional spherical and/or cylindrical effect, which is added to the automatically changeable corrective effect.

Figure 3:
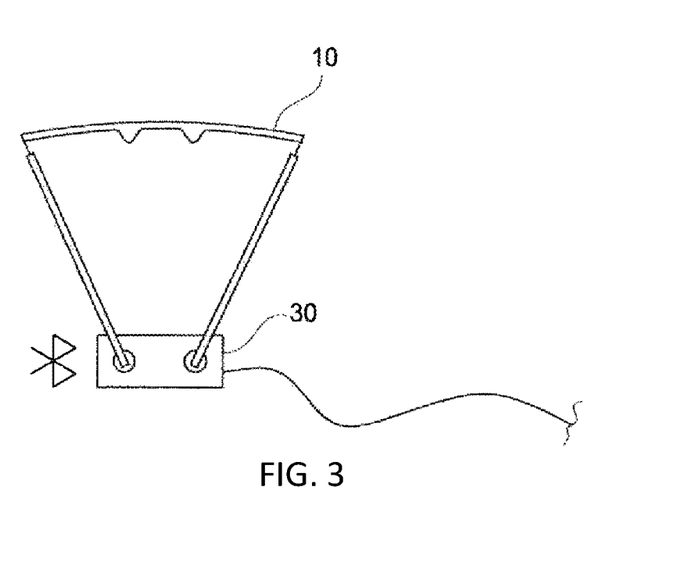
FIG. 3 shows a charging station for a pair of spectacles according to an exemplary embodiment.

FIG. 3 shows a schematic illustration of a pair of spectacles 10, which is disposed in a charging bracket 30 or docking station 30. To this end, the pair of spectacles 10 can be plugged into corresponding cutouts of the charging bracket 30 with the temple ends of the temples 16 such that the connector elements 22 establish electrical contact with corresponding contact points of the charging bracket 30. By way of example, the power reservoir 20 can be recharged by way of the electronic contact. Typically, the charging bracket 30 can communicate with the control unit 18 via the contact points, for example in order to transmit information to the control unit 18, for instance treatment plans and/or information in relation to predetermined periods of time and/or changes in the corrective effect to be performed, and/or in order to read information from the control unit 18, for instance recorded information about the duration of wear, wearing habits and/or the state of the power reservoir and/or other components of the pair of spectacles. By way of example, the charging bracket 30 can be connected to a computer and/or a server in order to receive information therefrom and/or in order to transmit information thereto and/or in order to establish communication between the control unit 18 and the computer and/or the server.

As an alternative or in addition thereto, a wireless connection can also be established between the control unit 18 and a computing unit, for instance a smartphone, for instance via Bluetooth and/or Wi-Fi and/or near field communication (NFC). As an alternative or in addition thereto, the power reservoir 20 can also be charged wirelessly by way of induction. To this end, the pair of spectacles 10 can typically be embodied with RFID antennas. Typically, the pair of spectacles 10 and the charging station 30 are designed such that the pair of spectacles 10 is disposed in the charging station 30 when the pair of spectacles 10 is not worn by the user. By way of example, provision can be made for the pair of spectacles 10 to be disposed in the charging station 30 at night in order to recharge the power reservoir 20 of the pair of spectacles 10 and/or in order to read data from the control unit 18 and/or transmit data to the control unit.

According to a typical exemplary embodiment, it may be necessary to dispose the pair of spectacles 10 in the charging station 30 prior to the first use of the pair of spectacles 10 in order to configure the pair of spectacles 10 for the user, i.e., in order to set the user-specific correction data, for instance the corrective effect and the predetermined period of time specific to the user. By way of example, the user-specific data can be based on clinical studies and/or medical examinations. According to a typical exemplary embodiment, it may be necessary to only retransmit the user-specific data to the control unit 18 if a change therein is necessary.

Figure 4:
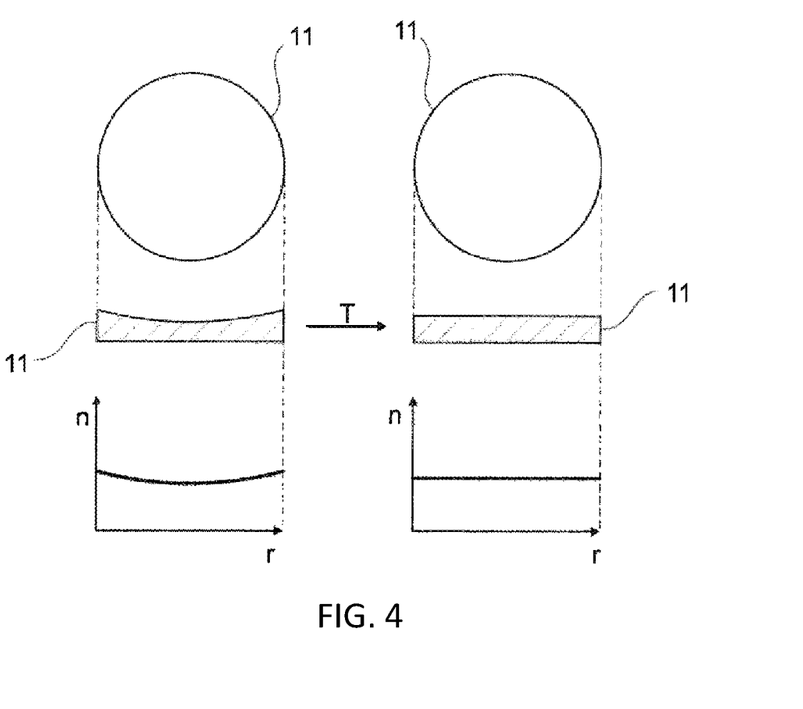
FIG. 4 shows a schematic illustration of the refractive power of an ophthalmic lens according to an exemplary embodiment.

FIG. 4 shows, in exemplary fashion, a schematic illustration of the change in form of an ophthalmic lens 11 during the passive change of the corrective effect over a predetermined period of time T.

In the upper region, FIG. 4 shows, in exemplary fashion, the form of the ophthalmic lens 11 in a plan view, the latter having a round form. In the middle, the ophthalmic lens 11 is shown in a cross-sectional view. In the lower region, the curve of the refractive index n over the diameter r is illustrated symbolically; this may represent an accompaniment of the form of the ophthalmic lens 11 or, in terms of its optical effect, may be equivalent to the deformation of the ophthalmic lens 11 illustrated thereabove in each case.

The left half of FIG. 4 illustrates the situation at the start of the predetermined period of time T. At this time, a surface of the ophthalmic lens 11 has a concave curvature in order to provide a refractive corrective effect. Assisting this, or as an alternative thereto, the equivalent refractive index curve has a concave form over the diameter of the ophthalmic lens 11. At the end of the predetermined period of time T, during which the automated change led to a gradual and continuous decrease in the corrective effect, no corrective effect is present any more—as an example in this case—and so the ophthalmic lens 11 has a planar cross-sectional form and, assisting this, or as an alternative thereto, the equivalent refractive index curve n is constant over the diameter r.

Here, FIG. 4 only shows the changeable part of the corrective effect of the ophthalmic lens. This may be complemented by a static corrective effect by means of a non-deformable, curved lens component, which corresponds to a conventional ophthalmic lens. The changeable lens component shown in FIG. 4 can be cemented to the static lens component to this end.

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

LIST OF REFERENCE SIGNS

10 Pair of spectacles
11 Ophthalmic lens
12, 12a, 12b Spectacle lens
14 Frame
16 Temple
18 Control unit
20 Power reservoir
22 Connector element
24 Liquid crystal layer
26, 26a, 26b Electrode
28 Polymer layer or glass layer
30 Charging station or docking station

The invention claimed is:

1. A pair of spectacles comprising:
two ophthalmic lenses configured as spectacle lenses, each ophthalmic lens having a changeable corrective effect,
the ophthalmic lenses each having at least two at least partly transparent electrodes and a liquid crystal layer disposed between the at least two at least partly transparent electrodes;
a plurality of temples; and
a control unit arranged in the temples of the pair of spectacles and configured to control the liquid crystal layer and to supply the liquid crystal layer with energy;
wherein the pair of spectacles is configured to automatically change the respective corrective effect of the ophthalmic lenses over a predetermined period of time of at least 30 minutes gradually and in accordance with one of the following properties: monotonically increasing, strictly monotonically increasing, monotonically decreasing, or strictly monotonically decreasing, and
wherein the pair of spectacles is configured to change the respective corrective effect for the two ophthalmic lenses in a same way or in different ways.

2. A pair of spectacles comprising:
two ophthalmic lenses configured as spectacle lenses, each ophthalmic lens having a changeable corrective effect,
wherein the pair of spectacles is configured to automatically change the corrective effect of the ophthalmic lenses over a predetermined period of time of at least 30 minutes, wherein the change in the respective corrective effect is gradual over the predetermined period of time, and wherein the pair of spectacles is further configured to change the respective corrective effect for the two spectacle lenses in a same way or in different ways,
wherein the ophthalmic lenses each comprise:
at least two at least partly transparent electrodes; and
a liquid crystal layer disposed between the at least two at least partly transparent electrodes,
wherein the ophthalmic lenses are configured to automatically change the respective corrective effect over the predetermined period of time with the liquid crystal layer; and
a control unit configured to control the liquid crystal layer and to supply the liquid crystal layer with energy, wherein the control unit is arranged in a temple of the pair of spectacles.

* * * * *